(12) United States Patent
Zobel et al.

(10) Patent No.: US 6,797,784 B1
(45) Date of Patent: Sep. 28, 2004

(54) THERMOPLASTIC RESINS WITH A LOW PROPORTION OF COARSE PARTICLES

(75) Inventors: Michael Zobel, Köln (DE); Dieter Wittmann, Leverkusen (DE); Herbert Eichenauer, Dormagen (DE); Alfred Eitel, Johann (AT); Thomas Eckel, Dormagen (DE); Bernd Keller, Geldern (DE); Hans-Bernhard Hauertmann, Dormagen (DE); Dorothy Rose, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/831,097

(22) PCT Filed: Oct. 28, 1999

(86) PCT No.: PCT/EP99/08182

§ 371 (c)(1),
(2), (4) Date: May 3, 2001

(87) PCT Pub. No.: WO00/27918

PCT Pub. Date: May 18, 2000

(30) Foreign Application Priority Data

Nov. 10, 1998 (DE) .......................................... 198 51 676

(51) Int. Cl.$^7$ .......................... C08F 279/00; C08L 51/04
(52) U.S. Cl. ........................ 525/316; 525/317; 525/322; 525/324; 525/64; 525/71; 525/90; 524/504
(58) Field of Search ............................... 525/316, 317, 525/322, 324, 64, 71, 90; 524/504

(56) References Cited

U.S. PATENT DOCUMENTS

| | | | |
|---|---|---|---|
| 3,509,238 A | | 4/1970 | Aubrey et al. ............... 260/876 |
| 3,919,353 A | * | 11/1975 | Castelnuovo et al. |
| 3,928,494 A | | 12/1975 | Allberti ................... 260/876 R |
| 3,969,431 A | * | 7/1976 | Gallagher .................... 260/884 |
| 4,336,210 A | * | 6/1982 | McClain ...................... 528/499 |
| 4,426,499 A | * | 1/1984 | Korte et al. ................. 525/316 |
| 4,747,959 A | | 5/1988 | Ho et al. ..................... 210/768 |
| 4,937,285 A | | 6/1990 | Wittmann et al. ............. 525/67 |
| 4,983,658 A | | 1/1991 | Kress et al. ................. 524/141 |
| 5,030,675 A | | 7/1991 | Wittmann et al. ........... 524/130 |
| 5,204,394 A | | 4/1993 | Gosens et al. ............... 524/125 |
| 5,242,596 A | | 9/1993 | Bachem et al. ............. 210/644 |
| 5,455,292 A | | 10/1995 | Kakegawa et al. .......... 524/141 |
| 5,552,465 A | * | 9/1996 | Witmann et al. ........... 524/139 |
| 5,679,759 A | | 10/1997 | Wittmann et al. ........... 528/196 |
| 5,961,915 A | | 10/1999 | Toyouchi et al. ........... 264/572 |
| 6,020,081 A | | 2/2000 | Raith et al. ................. 428/704 |
| 6,060,583 A | | 5/2000 | Raith et al. ................. 528/488 |
| 6,083,428 A | | 7/2000 | Ueda et al. ................. 252/609 |
| 6,093,759 A | | 7/2000 | Gareiss et al. ............. 524/122 |

FOREIGN PATENT DOCUMENTS

| | | |
|---|---|---|
| EP | 0 535 908 | 4/1993 |
| EP | 0 634 445 | 1/1995 |
| EP | 0 728 811 | 8/1996 |
| EP | 0 767 204 | 4/1997 |
| JP | 59-202240 | 11/1984 |

OTHER PUBLICATIONS

Houben Weyl XIV/1, Makromolekulare Stoffe 1, pp. 348–356, (Georg Thieme Verlag Stuttgart) (month unavailable) 1961, H. Logemann u.a.: Allgemeines zur Polymersation in heterogener Phase.
**Lorenz et al: "bestimmung der tellchengrößenverteilung wäβriger polymerdispersionen", Kautschuk und Gummi—Kunststoffe., Bd. 42, Nr. 12, 1989, Selten 1101–1106, XP002133882, Dr. Alfred Huthig Verlag GMBH. Heidelberg., DE.
**Elisseeva, Ivanchev, Kuchanov, Lebedev: "emulsion polymerization", Consultants Bureau, New York US XP002133883, Seite 114–Seite 122, 1982.
**Ham: "venyl polymerization ii" 1969, Marcel Dekker, New York US XP002133884, Seite 103—113.

* cited by examiner

Primary Examiner—James J. Seidleck
Assistant Examiner—Olga Asinovsky May
(74) Attorney, Agent, or Firm—Jill Denesvich; Godfried R. Akorli

(57) ABSTRACT

The invention relates to homopolymers and/or copolymers containing <100 ppm coarse particles with a particle diameter of between 200 and 500 μm, to thermoplastic moulding materials containing said homopolymtrs and/or copolymers, to the use of the homopolymers and/or copolymers and moulding materials for the production of moulded parts and to the moulded parts themselves.

15 Claims, No Drawings

THERMOPLASTIC RESINS WITH A LOW PROPORTION OF COARSE PARTICLES

FIELD OF THE INVENTION

The present invention relates to homo- and/or co-polymers and to thermoplastic moulding compositions having improved mechanical properties, and to the use thereof.

BACKGROUND OF THE INVENTION

Thermoplastic moulding compositions, especially those containing homo- and/or co-polymers of one or more ethylenically unsaturated monomers, polycarbonates and polyesters, are known from a large number of publications. This is true especially of the use of ABS polymers. Reference is made to the following documents solely by way of example: DE-A-196 16 968, WO 97/40 092, EP-A-728 811, EP-A-315 868 (=U.S. Pat. No. 4,937,285), EP-A-0 174 493 (U.S. Pat. No. 4,983,658), U.S. Pat. No. 5,030,675, JA-59 202 240, EP-A-0 363 608 (=U.S. Pat. No. 5,204,394), EP-A-0 767 204, EP-A-0 611 798, WO 96/27 600, EP-A-0 754 531.

It is known from the prior art to filter polymer lattices in order to remove impurities or coarse portions. For example, Houben Weyl XIV/1, Makromolekulare Stoffe 1, pages 348 to 356 (Georg Thieme Verlag, Stuttgart, 1961) and DE-A-4 126 483 and U.S. Pat. No. 4,747,959 describe the filtration of rubber lattices. Connections with the mechanical properties are not known from that prior art.

Thermoplastic moulding compositions having a particle diameter of from 0.20 to 0.35 μm are known from EP-A-0 704 488. A connection with elongation at tear, thermostability, natural shade and notched bar impact strength is not to be found in that prior art.

SUMMARY OF THE INVENTION

Accordingly, the object of the present invention is to make available homo- and/or co-polymers which are distinguished by improved mechanical properties, especially in respect of elongation at tear, thermostability, natural shade and notched bar impact strength, and by an especially consistent product quality.

That object is achieved by homo- and/or copolymers of one or more ethylenically unsaturated monomers ("vinyl monomers") selected from the group of the mono- or poly-unsaturated olefins, such as ethylene, propylene, chloroprene, 1,3-butadiene, isopropene, vinyl acetate, styrene, α-methylstyrene, styrenes substituted at the nucleus, vinyl cyanides, such as acrylonitrile, methacrylonitrile, maleic anhydride, N-substituted maleimides, $C_1$–$C_8$-alkyl acrylates and methacrylates, such as methyl acrylate and methyl methacrylate, which contain ≦100 ppm of coarse portions having mean particle diameters of from 200 to 500 μm. Special preference is given to coarse portions in amounts of ≦50 ppm, especially ≦10 ppm.

DETAILED DESCRIPTION OF THE INVENTION

The coarse portion of the homo- and/or co-polymers having mean particle diameters of from 100 to 200 μm is preferably less than 1000 ppm. Special preference is given to coarse portions of ≦500 ppm, especially ≦100 ppm. Portions of ≦50 ppm are very especially preferred.

In the case of mean particle diameters of from 50 to 100 μm, the coarse portion of the homo- and/or co-polymers is preferably ≦10,000 ppm. In the case of those mean particle diameters, coarse portions of ≦5000 ppm, especially of ≦1000 ppm, are especially preferred. Coarse portions of ≦500 ppm are very especially preferred.

The mean particle diameter of the homo- and/or co-polymers used is preferably from 0.04 to 1 μm, preferably from 0.1 to 0.6 μm.

The mean particle diameter $d_{50}$ (also called the particle size) is the diameter above and below which in each case 50 wt. % of the particles lie. It can be determined by means of ultracentrifuge measurement (W. Scholtan, H. Lange, Kolloid, Z. und Z. Polymere 250 (1972), 782–796).

According to the invention, the abovementioned homopolymers or copolymers of ethylenically unsaturated monomers are used. Mixtures of various homo- and/or co-polymers are also suitable.

There are suitable especially:
rubber-free vinyl polymers (A.1),
rubber-containing vinyl polymers, e.g. graft polymers of vinyl monomers with a rubber (A.2),
mixtures of rubber-free (A.1) and rubber-containing (A.2) vinyl polymers.

Preferred vinyl polymers A.1 are copolymers of, on the one hand, styrene, α-methylstyrene, styrene substituted at the nucleus, or mixtures thereof (A.1.1) and, on the other hand, acrylonitrile, methacrylonitrile, (meth)acrylic acid $C_1$–$C_8$-alkyl esters, maleic anhydride, N-substituted maleimide, or mixtures thereof (A.1.2).

The copolymers can contain preferably from 50 to 98 wt. % of A.1.1 and from 50 to 2 wt. % of A.1.2.

Especially preferred copolymers A.1 are those of styrene, acrylonitrile and, optionally, methyl methacrylate, of α-methylstyrene, acrylonitrile and, optionally, methyl methacrylate, and of styrene, α-methylstyrene, acrylonitrile and, optionally, methyl methacrylate.

The most well known are styrene-acrylonitrile copolymers, which can be prepared by radical polymerisation, especially by emulsion, suspension, solution or mass polymerisation. The copolymers A.1 preferably have molecular weights $\overline{M}_w$ (weight average, calculated by light scattering or sedimentation) of from 15,000 to 200,000.

Other especially preferred copolymers A.1 are randomly constructed copolymers of styrene and maleic anhydride, which can be prepared from the corresponding monomers, for example, by continuous mass or solution polymerisation with incomplete conversions. Their composition can be varied within wide limits. Preferably they contain from 5 to 25 wt. % of maleic anhydride units.

Instead of styrene, these polymers may also contain styrenes substituted at the nucleus, such as p-methylstyrene, vinyltoluene, 2,4-dimethylstyrene and other substituted styrenes, such as α-methylstyrene.

The rubber-containing vinyl polymers A.2 include, for example, graft (co)polymers having elastomeric properties, which are obtainable substantially from at least two of the following monomers: chloroprene, 1,3-butadiene, isopropene, styrene, α-methylstyrene, acrylonitrile, ethylene, propylene, vinyl acetate, $C_1$–$C_8$-alkyl acrylates and methacrylates. Such polymers are described, for example, in "Methoden der Organischen Chemie" (Houben-Weyl), Vol. 14/1, Georg Thieme-Verlag, Stuttgart, 1961, p. 393–406, and in C. B. Bucknall, "Toughened Plastics", Appl. Science Publishers, London 1977. In general, the polymers A.2 are partially crosslinked and generally have gel contents of over 20 wt. %, preferably over 40 wt. %.

Preferred rubber-like vinyl polymers A.2 are graft polymers of:

A.2.1 from 5 to 95 parts by weight, preferably from 30 to 80 parts by weight, of a mixture of A.2.1.1 from 50 to 95 parts by weight of styrene, α-methylstyrene, styrenes substituted at the nucleus by halogen or by methyl, (meth)acrylic acid $C_1$–$C_8$-alkyl esters, or mixtures of these compounds, and A.2.1.2 from 5 to 50 parts by weight of acrylonitrile, methacrylonitrile, (meth)acrylic acid $C_1$–$C_8$-alkyl esters, maleic anhydride, maleimides N-substituted by $C_1$–$C_4$-alkyl or by phenyl, or mixtures of these compounds, with A.2.2 from 5 to 95 parts by weight, preferably from 20 to 70 parts by weight, of rubber polymer having a glass transition temperature below −10° C.

Preferred graft polymers A.2 are, for example, polybutadienes grafted with styrene and/or acrylonitrile and/or alkyl acrylates or methacrylates, butadiene/styrene copolymers and acrylate rubbers; i.e. copolymers of the type described in DE-OS 1 694 173 (=U.S. Pat. No. 3,564,077); polybutadienes grafted with acrylic or methacrylic acid alkyl esters, vinyl acetate, acrylonitrile, styrene and/or alkylstyrenes, butadiene/styrene or butadiene/acrylonitrile copolymers, polyisobutene or polyisoprene, as are described, for example, in DE-OS 2 348 377 (=U.S. Pat. No. 3,919,353).

Especially preferred polymers A.2 are ABS polymers, as are described, for example, in DE-OS 2 035 390 (=U.S. Pat. No. 3,644,574) and in DE-OS 2 248 242 (=GB-B 1 409 275).

Special preference is given according to the invention to graft rubbers having rubber contents of at least 50 wt. %, preferably at least 55 wt. %.

Especially preferred graft polymers A.2 are obtainable by graft polymerisation of α. from 10 to 70 wt. %, preferably from 15 to 50 wt. %, especially from 20 to 40 wt. %, based on graft polymer A.2, of acrylic acid esters or methacrylic acid esters, or from 10 to 70 wt. %, preferably from 15 to 50 wt. %, especially from 20 to 40 wt. %, of a mixture of from 10 to 50 wt. %, preferably from 20 to 35 wt. %, based on the mixture, of acrylonitrile, acrylic acid esters or methacrylic acid esters, and from 50 to 90 wt. %, preferably from 65 to 80 wt. %, based on the mixture, of styrene or styrenes substituted at the nucleus, or a mixture thereof(as the graft overlay A.2.1) with β. from 30 to 90 wt. %, preferably from 50 to 85 wt. %, especially from 60 to 80 wt. %, based on graft polymer A.2, of a butadiene polymer having at least 50 wt. %, based on β, of butadiene radicals (as the graft base A.2.2).

In general, the gel content of the graft base β is at least 20 wt. % (measured in toluene), and the degree of grafting G is from 0.15 to 0.55.

Acrylic acid esters or methacrylic acid esters a are esters of acrylic acid or methacrylic acid and monohydric alcohols having from 1 to 8 carbon atoms. Special preference is given to methyl methacrylate, ethyl methacrylate, propyl methacrylate, n-butyl acrylate, tert-butyl acrylate and tert-butyl methacrylate.

In addition to butadiene radicals, the butadiene polymer β can contain up to 50 wt. %, based on β, of radicals of other ethylenically unsaturated monomers, such as styrene, acrylonitrile, $C_1$–$C_4$-alkyl esters of acrylic or methacrylic acid (such as methyl acrylate, ethyl acrylate, methyl methacrylate, ethyl methacrylate), vinyl esters and/or vinyl ethers). Polybutadiene is preferred.

It is known that in the graft polymerisation, the graft monomers are not polymerised on to the graft base completely; according to the invention, however, graft polymers A.2 include products obtained by polymerisation of the graft monomers in the presence of the graft base.

Other especially preferred polymers A.2 are graft polymers of

τ. from 20 to 90 wt. %, based on A.2, of acrylate rubber having a glass transition temperature below −20° C. as the graft base A.2.2, and δ. from 10 to 80 wt. %, based on A.2, of at least one polymerisable, ethylenically unsaturated monomer, as the graft monomer A2.1.

The acrylate rubbers of the polymers A.2 are preferably polymers of acrylic acid alkyl esters, optionally having up to 40 wt. %, based on τ, of other polymerisable, ethylenically unsaturated monomers. The preferred polymerisable acrylic acid esters include $C_1$-$C_{12}$-alkyl esters, preferably $C_1$–$C_8$-alkyl esters, for example methyl-, ethyl-, butyl-, n-octyl- and 2-ethyl-hexyl esters; haloalkyl esters, preferably halo-$C_1$–$C_8$-alkyl esters, such as chloroethyl acrylate, as well as mixtures of these monomers.

For crosslinking, monomers having more than one polymerisable double bond may be copolymerised. Preferred examples of crosslinking monomers are esters of unsaturated monocarboxylic acids having from 3 to 8 carbon atoms and of unsaturated monohydric alcohols having from 3 to 12 carbon atoms or of saturated polyols having from 2 to 4 OH groups and from 2 to 20 carbon atoms, such as, for example, ethylene glycol dimethacrylate, allyl methacrylate; polyunsaturated heterocyclic compounds, such as, for example, trivinyl and triallyl cyanurate; polyfunctional vinyl compounds, such as di- and tri-vinylbenzenes; and also triallyl phosphate and diallyl phthalate.

Preferred crosslinking monomers are allyl methacrylate, ethylene glycol dimethacrylate, diallyl phthalate and heterocyclic compounds having at least 3 ethylenically unsaturated groups.

Especially preferred crosslinking monomers are the cyclic monomers triallyl cyanurate, triallyl isocyanurate, trivinyl cyanurate, triacryloylhexahydro-s-triazine, triallylbenzenes.

The amount of crosslinking monomers is preferably from 0.02 to 5 wt. %, especially from 0.05 to 2 wt. %, based on the graft base τ.

In the case of cyclic crosslinking monomers having at least 3 ethylenically unsaturated groups it is advantageous to restrict the amount to less than 1 wt. % of the graft base τ.

Preferred "other" polymerisable, ethylenically unsaturated monomers which, in addition to the acrylic acid esters, may optionally be used for the preparation of the graft base are, for example, acrylonitrile, styrene, α-methylstyrene, acrylamides, vinyl-$_1$–$C_6$-alkyl ethers, methyl methacrylate, butadiene. Preferred acrylate rubbers as graft base τ are emulsion polymers having a gel content of at least 60 wt. %.

Other suitable graft bases according to A.2.2 are silicone rubbers having graft-active sites, as are described, for example, in DE-OS 37 04 657, DE-OS 37 04 655, DE-OS 36 31 540 and DE-OS 36 31 539.

The gel content of the graft base A.2.2 is determined at 25° C. in dimethylformamide (M. Hoffmann, H. Krömer, R. Kuhn, Polymeranalytik I und II, Georg-Thieme-Verlag, Stuttgart 1977).

The graft polymers A.2 can be prepared by known processes, such as mass, suspension, emulsion or mass-suspension processes.

According to the invention, filtration over a filter having a mean mesh size of ≦200 μm is preferred. Mesh sizes of ≦150 μm are especially preferred. Mesh sizes of ≦100 μm are most preferred.

It is also preferred that the mean mesh size should not be less than 50 μm; since, if the mesh sizes are too small, there is the risk that the transverse forces will be too high. Moreover, the speed of filtration is slowed to such an extent that the outlay in terms of time becomes too high or the throughput is reduced too greatly.

Any known materials may be considered for the filters. These include, for example, metals or fabrics of any kind.

The homo- and/or co-polymers according to the invention prepared by means of the described filtration are distinguished by a significant improvement in their mechanical properties. In particular, the elongation at tear, natural shade, thermostability and notched bar impact strength are improved to a degree which was not foreseeable. Moreover, they have a surprisingly consistent product quality.

According to the invention, the described homo- and/or co-polymers can be partially replaced by other thermoplastic polymers. The other thermoplastic polymers are preferably selected from at least one thermoplastic polymer from the group of the polycarbonates, polyester carbonates, polyesters, preferably polyalkylene terephthalates, and conventional (co)polymers according to the above-described component A.1, but without the coarse portion of particles according to the invention.

The moulding compositions according to the invention may also contain other additives selected from at least one of the group of the flameproofing agents, anti-dripping agents, very finely divided inorganic compounds and filling and reinforcing materials.

The thermoplastic moulding compositions preferably contain
- A. from 0.5 to 60 parts by weight, preferably from 1 to 40 parts by weight, of the homo- and/or co-polymers according to the invention,
- B. from 40 to 99 parts by weight, preferably from 50 to 95 parts by weight, of polycarbonates and/or polyester carbonates,
- C. from 0 to 50 parts by weight, preferably from 1 to 30 parts by weight, especially from 2 to 25 parts by weight, of copolymers of styrene, α-methylstyrene, styrene substituted at the nucleus, or mixtures thereof, and acrylonitrile, methacrlonitrile, (meth)acrylic acid $C_1$–$C_8$-alkyl esters, maleic anhydride, N-substituted maleimides, or mixtures thereof,
- D. from 0 to 45 parts by weight, preferably from 0 to 30 parts by weight, especially from 0 to 25 parts by weight, of polyalkylene terephthalate.

The sum of all the components of the moulding compositions according to the invention is 100.

Some of component A may be replaced by conventional ABS polymers.

Suitable polycarbonates and/or polyester carbonates are known from the literature or can be prepared by processes which are known from the literature (for the preparation of aromatic polycarbonates see, for example, Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610, DE-OS 3 832 396; for the preparation of aromatic polyester carbonates see, for example, DE-OS 3 077 934).

The preparation of aromatic polycarbonates is effected, for example, by reaction of diphenols with carbonic acid halides, preferably phosgene, and/or with aromatic dicarboxylic acid dihalides, preferably benzenedicarboxylic acid dihalides, by the boundary surface process, optionally with the use of chain terminators, for example monophenols, and optionally with the use of branching agents having a functionality of three or more, for example triphenols or tetraphenols.

Diphenols for the preparation of the aromatic polycarbonates and/or aromatic polyester carbonates are preferably those of formula (I)

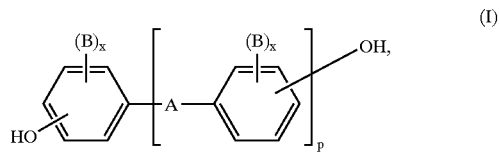

wherein

A represents a single bond, $C_1$–$C_5$-alkylene, $C_2$–$C_5$-allylidene, $C_1$–$C_6$-cycloalkylidene, —O—, —SO—, —CO—, —S—, —SO$_2$—, $C_6$–$C_{12}$-arylene, to which there may be condensed further aromatic rings optionally containing heteroatoms, or a radical of formula (II) or (III)

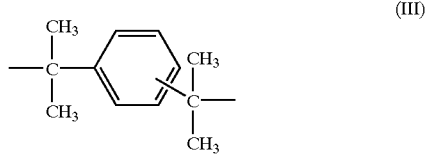

the substituents B each represent $C_1$–$C_{12}$-alkyl, preferably methyl, halogen, preferably chlorine and/or bromine, the substituents x are each independently of the other 0, 1 or 2, p represents 0 or 1, and $R^1$ and $R^2$ can be selected individually for each $X^1$ and are each independently of the other hydrogen or $C_1$–$C_6$-alkyl, preferably hydrogen, methyl or ethyl, $X^1$ represents carbon, and m represents an integer from 4 to 7, preferably 4 or 5, with the proviso that at at least one atom $X^1$, $R^1$ and $R^2$ are simultaneously alkyl.

Preferred diphenols are hydroquinone, resorcinol, dihydroxydiphenols, bis(hydroxyphenyl)-$C_1$–$C_5$-alkanes, bis(hydroxyphenyl)-$C_5$–$C_6$-cycloalkanes, bis(hydroxyphenyl)ethers, bis(hydroxyphenyl)sulfoxides, bis(hydroxyphenyl) ketones, bis(hydroxyphenyl)sulfones and α,α-bis(hydroxyphenyl)diisopropyl-benzenes and their derivatives brominated or chlorinated at the nucleus.

Especially preferred diphenols are 4,4'-dihydroxydiphenyl, bisphenol A, 2,4-bis(4-hydroxyphenyl)-2-methylbutane, 1,1-bis(4-hydroxyphenyl)-cyclohexane, 1,1-bis(4-hydroxyphenyl)-3,3,5-trimethylcyclohexane, 4,4'-dihydroxydiphenyl sulfide, 4,4'-dihydroxydiphenyl-sulfone and their di- and tetra-brominated or chlorinated derivatives, such as, for example, 2,2-bis(3-chloro-4-hydroxyphenyl)-propane, 2,2-bis(3,5dichlorhydroxyphenyl)-propane or 2,2-bis(3,5-dibromo-4-hydroxyphenyl)-propane.

Special preference is given to 2,2-bis(4-hydroxyphenyl)-propane (bisphenol A).

The diphenols can be used singly or in the form of any desired mixtures.

The diphenols are known from the literature or are obtainable by processes which are known from the literature.

Suitable chain terminators for the preparation of the thermoplastic, aromatic polycarbonates are, for example, phenol, p-chlorophenol, p-tert-butylphenol or 2,4,6-tribromophenol, but also long-chained alkylphenols, such as 4-(1,3-tetramethylbutyl)-phenol according to DE-OS 2 842 005 or monoalkylphenols or dialkylphenols having a total of from 8 to 20 carbon atoms in the alkyl substituents, such as 3,5-di-tert-butylphenol, p-isooctylphenol, p-tert-octylphenol, p-dodecylphenol and 2-(3,5-dimethylheptyl)-phenol and 4-(3,5-dimethylheptyl)-phenol. The amount of chain terminators to be used is generally from 0.5 mol. % to 10 mol. %, based on the molar sum of the diphenols used in a particular case.

The thermoplastic, aromatic polycarbonates have mean weight-average molecular weights ($\overline{M}_w$, measured, for example, by means of an ultracentrifuge or scattered-light measurement) of from 10,000 to 200,000, preferably from 20,000 to 80,000.

The thermoplastic, aromatic polycarbonates can be branched in a known manner, preferably by the incorporation of from 0.05 to 2 mol. %, based on the sum of the diphenols used, of compounds having a functionality of three or more, for example compounds having three or more phenolic groups.

Both homopolycarbonates and copolycarbonates are suitable. For the preparation of copolycarbonates according to the invention, from 1 to 25 wt. %, preferably from 2.5 to 25 wt. % (based on the total amount of diphenols to be used) of polydiorganosiloxanes having hydroxy-aryloxy terminal groups may also be used. They are known (see, for example, U.S. Pat. No. 3,419,634) or can be prepared by processes which are known from the literature. The preparation of polydiorganosiloxane-containing copolycarbonates is described, for example, in DE-OS 3 334 782.

Preferred polycarbonates are, in addition to the homopolycarbonates of bisphenol A, the copolycarbonates of bisphenol A having up to 15 mol. %, based on the molar sum of diphenols, of diphenols other than those mentioned as being preferred or especially preferred, especially 2,2-bis (3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Mixtures of the diacid dichlorides of isophthalic acid and terephthalic acid in a ratio of from 1:20 to 20:1 are especially preferred.

In the preparation of polyester carbonates, a carbonic acid halide, preferably phosgene, is additionally used concomitantly as bifunctional acid derivative.

As chain terminators for the preparation of the aromatic polyester carbonates, in addition to the monophenols already mentioned, their chlorocarbonic acid esters and the acid chlorides of aromatic monocarboxylic acids, which may optionally be substituted by $C_1$–$C_{22}$-alkyl groups or by halogen atoms, as well as aliphatic $C_2$–$C_{22}$-monocarboxylic acid chlorides may be considered.

The amount of chain terminators is in each case from 0.1 to 10 mol. %, based in the case of the phenolic chain terminators on moles of diphenols and in the case of monocarboxylic acid chloride chain terminators on moles of dicarboxylic acid dichlorides.

The aromatic polyester carbonates may also contain aromatic hydroxycarboxylic acids incorporated therein.

The aromatic polyester carbonates may be either linear or branched in a known manner (see in this connection likewise DE-OS 2 940 024 and DE-OS 3 007 934).

There may be used as branching agents, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol. % (based on dicarboxylic acid dichlorides used), or phenols having a functionality of three or more, such as phloroglucinol, 4,6-dimethyl-2,4,6-tri-(4-hydroxyphenyl)-hept-2-ene, 4,4-methyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxy-triphenyl)-methyl]-benzene, in amounts of from 0.01 to 1.0 mol. %, based on diphenols used. Phenolic branching agents can be used initially with the diphenols, acid chloride branching agents can be introduced together with the acid dichlorides.

The content of carbonate structural units in the thermoplastic, aromatic polyester carbonates can vary as desired. The carbonate group content is preferably up to 100 mol. %, especially up to 80 mol. %, more especially up to 50 mol. %, based on the sun of ester groups and carbonate groups. Both the esters and the carbonates contained in the aromatic polyester carbonates can be present in the polycondensation product in the form of blocks or in a randomly distributed manner.

The relative solution viscosity ($\eta_{rel}$) of the aromatic polycarbonates and polyester carbonates is in the range of from 1.18 to 1.4, preferably from 1.22 to 1.3 (measured on solutions of 0.5 g of polycarbonate or polyester carbonate in 100 ml of methylene chloride solution at 25° C.).

The thermoplastic, aromatic polycarbonates and polyester carbonates can be used alone or in any desired mixture with one another.

The polycarbonates may also be partially replaced by polyesters.

Preferred polyesters are polyalkylene terephthalates. These are reaction products of aromatic dicarboxylic acids (or their reactive derivatives, e.g. dimethyl esters or anhydrides) and aliphatic, cycloaliphatic or arylaliphatic diols and mixtures of such reaction products.

Preferred polyalkylene terephthalates can be prepared from terephthalic acids (or their reactive derivatives) and aliphatic and cycloaliphatic diols having from 2 to 10 carbon atoms by known methods (Kunststoff-Handbuch, Volume VIII, p. 695 et seq., Carl Hanser Verlag, Munich 1973).

Preferred polyalkylene terephthalates contain from 80 to 100 mol. %, preferably from 90 to 100 mol. %, based on the dicarboxylic acid component, of terephthalic acid radicals and from 80 to 100 mol. %, preferably from 90 to 100 mol. %, based on the diol component, of ethylene glycol and/or 1,4-butanediol radicals. In addition to terephthalic acid radicals they also contain from 0 to 20 mol. % of radicals of other aromatic dicarboxylic acids having from 8 to 14 carbon atoms or of aliphatic dicarboxylic acids having from 4 to 12 carbon atoms, such as radicals of phthalic acid, isophthalic acid, naphthalene-2,6-dicarboxylic acid, 4,4'-diphenyldicarboxylic acid, succinic acid, adipic acid, sebacic acid, azelaic acid or cyclohexanediacetic acid. In addition to ethylene glycol and/or 1,4-butanediol radicals, they also contain from 0 to 20 mol. % of other aliphatic diols having from 3 to 12 carbon atoms or cycloaliphatic diols having from 6 to 12 carbon atoms, for example radicals of 1,5-pentanediol, 1,6-hexanediol, 1,4-cyclohexanedimetaanol, 3-methyl-1,3- and -1,6-pentanediol, 2-ethyl-1,3-hexanediol, 2,2-diethyl-1,3-propanediol, 2,5-hexanediol, 1,4-di-(β-hydroxyethoxyphenyl)-propane, 2,4-dihydroxy-1,1,3,3-tetramethylcyclobutane, 2,2-bis(3-β-hydroxyethoxyphenyl)-propane and 2,2-bis(4-hydroxypropoxyphenyl)-propane (DE-OS 2 407 647, 2 407 776, 2 715 932).

The polyalkylene terephthalates can be branched by the incorporation of relatively small amounts of tri- or tetra-hydric alcohols or tri- or tetra-basic carboxylic acids, as are described in DE-OS 1 900 270 and U.S. Pat. No. 3,692,744. Examples of preferred branching agents are trimesic acid, trimellitic acid, trimethylol-ethane and -propane and pentaerythritol. It is advisable to use no more than 1 mol. % of the branching agent, based on the acid component.

Special preference is given to polyalkylene terephthalates which have been prepared solely from terephthalic acid (or its reactive derivatives, e.g. its dialkyl esters) and ethanediol and/or 1,4-butanediol, and mixtures thereof.

Preferred polyalkylene terephthalates are also copolyesters prepared from at least two of the above-mentioned diols; especially preferred copolyesters are poly-(ethylene glycol/1,4-butanediol) terephthalates. The various diol radicals can be present in the copolyesters in the form of blocks or in a randomly distributed manner.

The polyalkylene terephthalates generally have an intrinsic viscosity of from 0.4 to 1.4 dl/g, preferably from 0.5 to 1.3 dl/g, especially from 0.6 to 1.2 dl/g, in each case measured in phenol/o-chlorobenzene (1:1 parts by weight) at 25° C.

The thermoplastic moulding compositions according to the invention may also contain flameproofing agents. Both halogen-containing and halogen-free compounds are suitable for that purpose. The flameproofing agents will generally be added in an amount of from 0.1 to 35 parts by weight, preferably from 0.5 to 30 parts by weight, based on the sum of components A to D.

Suitable halogen compounds are organic chlorine and/or bromine compounds which are stable in the preparation and processing of the moulding compositions according to the invention, so that no corrosive gases are released and the effectiveness is not impaired as a result.

Halogen-containing compounds are, for example,
1. Chlorinated and brominated diphenyls, such as octachlorodiphenyl, decachlorodiphenyl, octabromodiphenyl, decabromodiphenyl.
2. Chlorinated and brominated diphenyl ethers, such as octa- and decachlorodiphenyl ether and octa- and decabromodiphenyl ether.
3. Chlorinated and brominated phthalic anhydride and its derivatives, such as phthalimides and bisphthalimides, e.g. tetrachloro- and tetrabromo-phthalic anhydride, tetrachloro- and tetrabromo-phthalimide, N,N'-ethylene-bis-tetrachloro- and N,N'-ethylene-bis-tetrabromo-phthalimide, N-methyltetrachloro- and N-methyltetrabromo-phthalimide.
4. Chlorinated and brominated bisphenols, such as 2,2-bis(3,5-dichloro-4-hydroxyphenyl)-propane and 2,2-bis(3,5-dibromo-4-hydroxyphenyl)-propane.
5. 2,2-Bis(3,5-dichloro-4-hydroxyphenyl)-propane oligocarbonate and 2,2-bis-(3,5-dibromo-4-hydroxyphenyl)-propane oligocarbonate having a mean degree of polycondensation of from 2 to 20.

Bromine compounds are preferred over chlorine compounds, and halogen-free compounds are preferred over these.

There are preferably suitable as flameproofing agents any phosphorus compounds usually used for that purpose, especially phosphine oxides and derivatives of acids of phosphorus and salts of acids and acid derivatives of phosphorus.

Derivatives (e.g. esters) of acids of phosphorus and their salts are preferred, wherein acids of phosphorus include phosphoric acid, phosphonic acid, phosphinic acid, phosphorous acid, in each case also in dehydrated form, salts are preferably alkali, alkaline earth metal and ammonium salts of these acids, and their derivatives (for example partially esterified acids) are also included.

There are suitable as phosphorus compounds, for example, metal compounds of monoesters of the phosphoric acid of formulae (IVa) and (IVb)

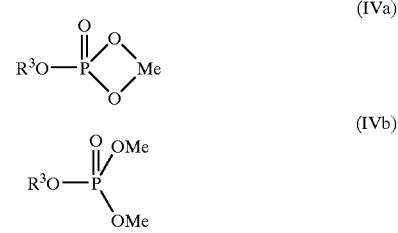

or metal compounds of diesters of the phosphoric acid according to formula (V)

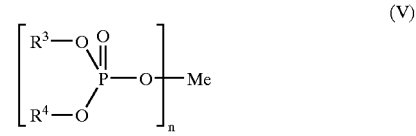

wherein
$R^3$ and $R^4$ are each independently of the other optionally halogenated $C_1$–$C_{24}$-alkyl; $C_5$–$C_6$-cycloalkyl, $C_6$–$C_{20}$-aryl or $C_7$–$C_{12}$-aralkyl, each of which is optionally substituted by halogen and/or by $C_1$–$C_{10}$-alkyl; or, in the case of formula (V), $R^3$ and $R^4$ together form an alkyl chain, Me represents a metal selected from main groups 1 and 3 and subgroups VIII, IB and IIB of the periodic system, and n is determined by the valency of the metal ion.

$R^3$ and $R^4$ are each independently of the other preferably optionally halogenated (preferably by chlorine and/or by bromine) $C_1$–$C_{15}$-alkyl, especially $C_1$–$C_{10}$-alkyl; cyclopentyl, cyclohexyl, phenyl, naphthyl, phenyl-$C_1$–$C_4$-alkyl (such as benzyl), each of which is optionally substituted by halogen (preferably chlorine and/or bromine) and/or by $C_1$–$C_6$-alkyl, especially $C_1$–$C_4$-alkyl, more especially methyl, ethyl, n-propyl, isopropyl.

Metals of main groups 2 and 3 and of sub-group II are preferred as the metals Me.

Me is especially preferably Mg, Ca, Ba, B, Al or Zn.

For the preparation of the metal compounds of phosphoric acid esters according to the invention there are suitable processes known from the literature, such as, for example, the transesterification process starting from triesters of phosphoric acid, or the acid halide process starting from phosphoryl chloride (EP-A-0 801 116; J. Org. Chem. 1978, Vol. 43, No. 1, p. 24–31).

Also suitable as flameproofing agents are phosphorus compounds of formula (VI)

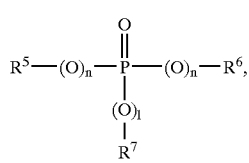

wherein $R^5$, $R^6$ and $R^7$ are each independently of the others an optionally halogenated $C_1$–$C_8$-alkyl or an optionally halogenated and/or alkylated $C_5$- or $C_6$-cycloalkyl or an optionally halogenated and/or alkylated and/or aralkylated $C_6$–$C_{30}$aryl, and "n" and "l" are each independently of the other 0 or 1.

These phosphorus compounds are generally known (see, for example, Ullman, Enzykiopaädie der technischen Chemie, Volume 18, pages 301 et seq., 1979). The aralkylated phosphorus compounds are described, for example, in DE-OS 38 24 356.

Optionally halogenated $C_1$–$C_8$-alkyl radicals according to (VI) may be mono- or poly-halogenated and linear or branched. Examples of alkyl radicals are chloroethyl, 2-chloropropyl, 2,3-dibromopropyl, butyl, methyl or octyl.

Optionally halogenated and/or alkylated $C_5$- or $C_6$-cycloalkyls according to (VI) are optionally mono- to poly-halogenated and/or -alkylated $C_5$- or $C_6$-cycloalkyls, that is to say, for example, cyclopentyl, cyclohexyl, 3,3,5-trimethylcyclohexyl and fully chlorinated cyclohexyl.

Optionally halogenated and/or alkylated and/or aralkylated $C_6$–$C_{30}$-aryl radicals according to (VI) are optionally mono- or poly-nuclear, mono- or poly-halogenated and/or alkylated and/or aralkylated, for example chlorophenyl, bromophenyl, pentachlorophenyl, pentabromophenyl, phenyl, cresyl, isopropylphenyl, benzyl-substituted phenyl and naphthyl.

$R^5$, $R^6$ and $R^7$ are each independently of the others preferably methyl, ethyl, butyl, octyl, phenyl, cresyl, cumyl or naphthyl. Especially preferably, $R^5$, $R^6$ and $R^7$ are each independently of the others methyl, ethyl, butyl, optionally methyl- and/or ethyl-substituted phenyl.

Phosphorus compounds according to formula (VI) which can be used according to the invention are, for example, tributyl phosphate, tris(2-chloroethyl)phosphate, tris(2,3-dibromopropyl)phosphate, triphenyl phosphate, tricresyl phosphate, diphenylcresyl phosphate, diphenyloctyl phosphate, diphenyl-2-ethylcresyl phosphate, tri-(isopropylphenyl) phosphate, tris(p-benzylphenyl) phosphate, triphenylphosphine oxide, methylphosphonic acid dimethyl esters, methanephosphonic acid diphenyl esters and phenylphosphonic acid diethyl esters.

Suitable flameproofing agents are also dimeric and oligomeric phosphates, as described, for example, in EP-A-0 363 608.

The moulding compositions according to the invention may contain as flameproofing agents phosphorus compounds according to formula (VII)

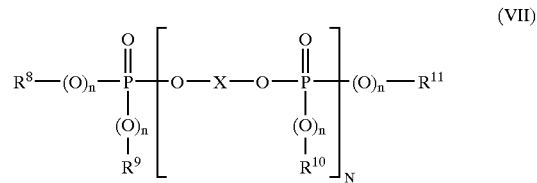

In the formula, $R^8$, $R^9$, $R^{10}$ and $R^{11}$ are each independently of the others $C_1$–$C_8$-alkyl, $C_5$–$C_6$-cycloalkyl, $C_6$–$C_{20}$-aryl or $C_7$–$C_{12}$-aralkyl, each of which is optionally halogenated.

$R^8$, $R^9$, $R^{10}$ and $R^{11}$ are each independently of the others preferably $C_1$–$C_4$-alkyl, phenyl, naphthyl or phenyl-$C_1$–$C_4$-alkyl. The aromatic groups $R^8$, $R^9$, $R^{10}$ and $R^{11}$ may in turn be substituted by halogen and/or alkyl groups, preferably chlorine, bromine and/or $C_1$–$C_4$-alkyl. Especially preferred aryl radicals are cresyl, phenyl, xylenyl, propylphenyl or butylphenyl and the corresponding brominated and chlorinated derivatives thereof.

X in formula (VII) represents a mono- or poly-nuclear aromatic radical having from 6 to 30 carbon atoms. It is derived preferably from diphenols of formula (I). Special preference is given to diphenylphenol, bisphenol A, resorcinol or hydroquinone or their chlorinated or brominated derivatives.

The substituents n in formula (VII) may, independently of one another, be 0 or 1; n is preferably 1.

N represents values of from 0 to 30, preferably an average value of from 0.3 to 20, especially from 0.5 to 10, more especially from 0.5 to 6.

It is also possible to use mixtures of from 10 to 90 wt. %, preferably from 12 to 40 wt. %, of at least one monophosphorus compound of formula (VI) and at least one oligomeric phosphorus compound or a mixture of oligomeric phosphorus compounds as described in EP-A-363 608 as well as phosphorus compounds according to formula (VII) in amounts of from 10 to 90 wt. %, preferably from 60 to 88 wt. %, based on the total amount of phosphorus compounds.

Monophosphorus compounds of formula (VI) are especially tributyl phosphate, tris(2-chloroethyl)phosphate, tris (2,3-dibromopropyl) phosphate, triphenyl phosphate, tricresyl phosphate, diphenylcresyl phosphate, diphenyloctyl phosphate, diphenyl-2-ethylcresyl phosphate, triisopropylphenyl)phosphate, halo-substituted aryl phosphates, methylphosphonic acid dimethyl esters, methylphosphonic acid diphenyl esters, phenylphosphonic acid diethyl esters, triphenylphosphine oxide or tricresylphosphine oxide.

The mixtures of monomeric and oligomeric phosphorus compounds of formula (VII) have average N values of from 0.3 to 20, preferably from 0.5 to 10, especially from 0.5 to 6.

The mentioned phosphorus compounds are known (see, for example, EP-A-363 608, EP-A640 655) or can be prepared by known methods in an analogous manner (e.g. Ullmanns Enzyklopädie der technischen Chemie, Vol. 18, p. 301 et seq., 1979; Houben-Weyl, Methoden der organischen Chemie, Vol. 12/1, p. 43; Beilstein Vol. 6, p. 177).

The phosphorus compounds which can be used according to the invention also include linear phosphazenes according to formula (VIII) and cyclic phosphazenes according to formula (IX)

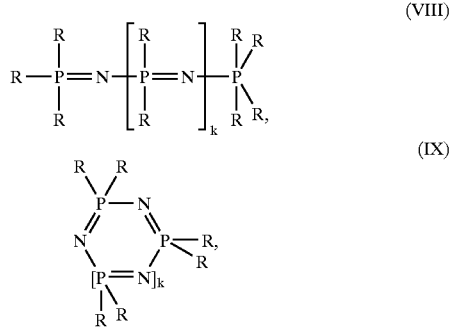

wherein
the substituents R are in each case identical or different and represent amino; $C_1$- to $C_6$-alkyl or $C_1$–$C_8$-alkoxy, each of which is optionally halogenated, preferably halogenated by fluorine; $C_5$- to $C_6$-cycloalkyl, $C_6$- to $C_{20}$-aryl, preferably phenyl or naphthyl, $C_6$–$C_{20}$-aryloxy, preferably phenoxy, naphthyloxy, or $C_7$–$C_{12}$-aralkyl, preferably phenyl-$C_1$–$C_4$-alkyl, each of which is optionally substituted by alkyl, preferably $C_1$–$C_4$-alkyl, and/or by halogen, preferably chlorine, bromine,
k represents 0 or a number from 1 to 15, preferably a number from 1 to 10.

There may be mentioned by way of examples: propoxyphosphazene, phenoxyphosphazene, methylphenoxyphosphazene, aminophosphazene and fluoroalkylphosphazene.

Phenoxyphosphazene is preferred.

The phosphazenes can be used alone or in the form of a mixture. The radicals R can always be identical, or two or more radicals in formulae (VIII) and (IX) can be different.

The phosphazenes and their preparation are described, for example, in EP-A-728 811, DE-A-1 961 668 and WO 97/40 092.

The moulding compositions according to the invention may also contain preferably from 0.05 to 5 parts by weight, especially from 0.1 to 1 part by weight, more especially from 0.1 to 0.5 part by weight, based on the total composition, of fluorinated polyolefins. Suitable fluorinated polyolefins have a high molecular weight and have glass transition temperatures of over —30° C., generally over 100° C. Their fluorine contents are preferably from 65 to 76 wt. %, especially from 70 to 76 wt. %. Their mean particle diameters $d_{50}$ are generally from 0.05 to 1000 μm, preferably from 0.08 to 20 μm. In general, the fluorinated polyolefins E have a density of from 1.2 to 2.3 g/cm³.

Preferred fluorinated polyolefins are polytetrafluoroethylene, polyvinylidene fluoride, tetrafluoroethylene/hexafluoropropylene copolymers and ethylene/tetrafluoroethylene copolymers.

The fluorinated polyolefins are known (see "Vinyl and Related Polymers" by Schildknecht, John Wiley & Sons, Inc., New York, 1962, pages 484 to 494; "Fluorpolymers" by Wall, Wiley-Interscience, John Wiley & Sons, Inc., New York, Volume 13, 1970, pages 623 to 654; "Modern Plastics Encyclopedia", 1970 to 1971, Volume 47, No. 10A, October 1970, McGraw-Hill, Inc., New York, pages 134 and 774; "Modern Plastics Encyclopedia", 1975 to 1976, October 1975, Volume 52, No. 10A, McGraw-Hill, Inc., New York, pages 27, 28 and 472, and U.S. Pat. Nos. 3,671,487, 3,723,373 and 3,838,092).

They can be prepared by known processes, for example by polymerisation of tetrafluoroethylene in an aqueous medium with a catalyst that forms free radicals, for example sodium, potassium or ammonium peroxydisulfate, at pressures of from 7 to 71 kg/cm² and at temperatures of from 0 to 200° C., preferably at temperatures of from 20 to 100° C. (For further details see, for example, U.S. Pat. No. 2,393,967.) Depending on the form in which they are used, the density of these materials may be from 1.2 to 2.3 g/cm³, and the mean particle diameter may be from 0.05 to 1000 μm.

Preferred fluorinated polyolefins are tetrafluoroethylene polymers. They have mean particle diameters of from 0.05 to 20 μm, preferably from 0.08 to 10 μm, and a density of from 1.2 to 1.9 g/cm³ and are preferably used in the form of a coagulated mixture of emulsions of the tetrafluoroethylene polymers E with emulsions of the graft polymers C.

Suitable fluorinated polyolefins which can be used in powder form are tetrafluoroethylene polymers having mean particle diameters of from 100 to 1000 μm and densities of from 2.0 g/cm³ to 2.3 g/cm³.

The thermoplastic moulding compositions according to the invention may also contain very finely divided inorganic compounds. The moulding compositions according to the invention preferably contain from 0.1 to 50 parts by weight, preferably from 0.1 to 10 parts by weight, based on the total amount. They may preferably consist of compounds of one or more metals of main groups 1 to 5 or sub-groups 1 to 8 of the periodic system, preferably main groups 2 to 5 or subgroups 4 to 8, especially main groups 3 to 5 or sub-groups 4 to 8, with at least one element selected from the group consisting of oxygen, sulfur, boron, phosphorus, carbon, nitrogen, hydrogen and silicon.

Preferred compounds are, for example, oxides, hydroxides, water-containing oxides, sulfates, sulfites, sulfides, carbonates, carbides, nitrates, nitrites, nitrides, borates, silicates, phosphates, hydrides, phosphites or phosphonates.

Preferred very finely divided inorganic compounds are, for example, TiN, $TiO_2$, $SnO_2$, WC, ZnO, $Al_2O_3$, AlO(OH), $ZrO_2$, $Sb_2O_3$, $SiO_2$, iron oxides, $Na_2SO_4$, Si, $BaSO_4$, vanadium oxides, zinc borate, silicates such as Al silicates, Mg silicates, one-, two-, three-dimensional silicates, mixtures and doped compounds can likewise be used. Furthermore, these nano-scale particles can be surface-modified by organic molecules in order to achieve better tolerability with the polymers. In that manner, hydrophobic or hydrophilic surfaces can be produced.

The average particle diameters are less than or equal to 200 nm, preferably less than or equal to 150 nm, especially from 1 to 100 nm.

Particle size and particle diameter always refer to the mean particle diameter $d_{50}$, determined by ultracentrifuge measurements according to W. Scholtan et al., Kolloid-Z. und Z. Polymere 250 (1972), p. 782 to 796.

The inorganic compounds may be in the form of powders, pastes, sols, dispersions or suspensions. Powders can be obtained from dispersions, sols or suspensions by precipitation.

The powders can be incorporated into the thermoplastic plastics by conventional processes, for example by direct kneading or extrusion of the constituents of the moulding composition and the very finely divided inorganic powders. Preferred processes are the preparation of a master batch, for example in flameproofing additives, other additives, monomers, solvents, the co-precipitation of dispersions of the above-described components of the thermoplastic moulding compositions according to the invention with dispersions, suspensions, pastes or sols of the very finely divided inorganic materials.

The moulding compositions according to the invention may also contain conventional additives, such as lubricating and mould release agents, nucleation agents, antistatics, stabilisers, filling and reinforcing materials as well as colourings and pigments.

The filled or reinforced moulding compositions can contain up to 60 wt. %, preferably from 10 to 40 wt. %, based on the filled or reinforced moulding composition, of filling and/or reinforcing materials. Preferred reinforcing materials are glass fibres. Preferred filling materials, which may also have a reinforcing effect, are glass beads, mica, silicates, quartz, talcum, titanium dioxide, wollastonite.

The moulding compositions according to the invention can be prepared by mixing the constituents in a known manner and melt-compounding or melt-extruding the mixture at elevated temperatures, preferably at from 200 to 350° C., in conventional devices, such as kneaders, extruders or double-shaft screws. The constituents can be mixed in succession or simultaneously. In special cases it may be advantageous to prepare pre-mixtures from the low-molecular-weight additives and the magnesium aluminium silicates.

The thermoplastic moulding compositions according to the invention are suitable on account of their very good mechanical properties for the production of moulded bodies of any kind, especially those having increased requirements as regards fracture resistance.

The moulding compositions of the present invention can be used for the production of moulded bodies of any kind. In particular, moulded bodies can be produced by injection moulding. Examples of moulded bodies which can be produced are: casing parts of any kind, e.g. for domestic appliances, such as juice extractors, coffee machines, mixers, for office equipment, such as monitors, printers, copiers, or covering plates for the construction sector and parts for the motor sector. In addition, they can be used in the field of electrical engineering, because they have very good electrical properties.

The moulding compositions according to the invention can also be used, for example, for producing the following moulded bodies or mouldings:

1. parts for finishing the interior of track vehicles (FR)
2. hub caps
3. casings for electrical appliances containing small transformers
4. casings for devices for distributing and transmitting information
5. casings and coverings for medical purposes
6. massage devices and casings therefor
7. toy vehicles for children
8. flat prefabricated wall panels
9. casings for security devices
10. rear spoilers
11. heat-insulated containers
12. device for keeping or caring for small animals
13. mouldings for sanitary and bathroom fittings
14. grids for covering ventilation openings
15. mouldings for garden and tool sheds
16. casings for gardening tools Another form of processing is the production of moulded bodies by deep drawing from previously prepared plates or films.

The invention is described in greater detail below with reference to the Examples:

EXAMPLES

Component A

A1 (Comparison)

Graft polymer of 40 parts by weight of a copolymer of styrene and acrylonitrile in a ratio of 73:27 with 60 parts by weight of particulate crosslinked polybutadiene rubber (mean particle diameter $d_{50}=0.3\,\mu m$), prepared by emulsion polymerisation.

The coarse portion having a particle diameter of from 200 to 500 $\mu m$ is 3800 ppm (determined by wet screening with subsequent gravimetric quantitative determination of the coarse portion).

A2 (Comparison)

Graft polymer of 40 parts by weight of a copolymer of styrene and acrylonitrile in a ratio of 73:27 with 60 parts by weight of particulate crosslinked polybutadiene rubber (mean particle diameter $d_{50}=0.35\,\mu m$), prepared by emulsion polymerisation.

The coarse portion having a particle diameter of from 200 to 500 $\mu m$ is 4100 ppm (determined by wet screening with subsequent gravimetric quantitative determination of the coarse portion).

A3

Graft polymer according to the invention of 40 parts by weight of a copolymer of styrene and acrylonitrile in a ratio of 73:27 with 60 parts by weight of particulate crosslinked polybutadiene rubber (mean particle diameter $d_{50}=0.3\,\mu m$), prepared by emulsion polymerisation.

The coarse portion having a particle diameter of from 200 to 500 $\mu m$ of the graft polymer according to the invention is less than 50 ppm (determined by wet screening with subsequent gravimetric quantitative determination of the coarse portion).

A4

Graft polymer according to the invention of 40 parts by weight of a copolymer of styrene and acrylonitrile in a ratio of 73:27 with 60 parts by weight of particulate crosslinked polybutadiene rubber (mean particle diameter $d_{50}=0.35\,\mu m$), prepared by emulsion polymerisation.

The coarse portion having a particle diameter of from 200 to 500 $\mu m$ of the graft polymer according to the invention is less than 50 ppm (determined by wet screening with subsequent gravimetric quantitative determination of the coarse portion).

Component B

Linear polycarbonate based on bisphenol A having a relative solution viscosity of 1.252 measured in $CH_2Cl_2$ as solvent at 25° C. and in a concentration of 0.5 g/100 ml.

Component C

Styrene/acrylonitrile copolymer having a styrene/acrylonitrile ratio of 72:28 and an intrinsic viscosity of 0.55 dl/g (measured in dimethylformamide at 20° C.).

Preparation and Testing of the Moulding Compositions According to the Invention

Components A–C are mixed using a 3 liter kneader. The moulded bodies are produced using an Arburg 270 E injection moulding machine at 260° C.

The notched bar impact strength is determined according to method ISO 1801 A using rods measuring 80×10×4 mm at room temperature.

The elongation at tear DR is determined within the framework of the determination of the modulus of elasticity in tension according to method ISO 527 using F3 shoulder rods.

The yellowness index is determined in accordance with ASTM D 1925.

In the case of the thermostability, specimen plates (60×40×2 mm) are injection moulded at a tool temperature of 80° C. and a composition temperature of from 260 to 300° C. The composition temperature is reached in 10° C. steps; the dwell time of the composition in the cylinder is 6 minutes.

A visual assessment of the surface is carried out according to the following criteria:

Symbol Assessment
0 not tested
1 i.o., smooth surface, no cracks
2 traces of disintegration, smooth surface, small, just visible cracks
3 minimal disintegration, smooth surface, up to 5 blistered cracks
4 slight disintegration, smooth surface, from 5 to 10 blistered cracks
5 moderate disintegration, cracked blistered surface, approximately half still smooth
6 severe disintegration, cracked surface, still smooth areas visible
7 very severe disintegration, foam-like condition
8 foam formation, sputters from nozzle, cannot be injection-moulded

TABLE 1

Composition and properties of the polycarbonate-ABS moulding compositions

| Example | 1 (comparison) | 2 | 3 (comparison) | 4 |
|---|---|---|---|---|
| Components parts by weight | | | | |
| A1 | 24.0 | — | — | — |
| A2 | — | — | 24.0 | — |
| A3 | — | 24.0 | — | — |
| A4 | — | — | — | 24.0 |
| B | 43.0 | 43.0 | 43.0 | 43.0 |
| C | 33.0 | 33.0 | 33.0 | 33.0 |
| Properties | | | | |
| $a_k$ (ISO 1801 A) kJ/m² | 81.1 | 90.0 | 72.1 | 92.8 |
| DR (ISO 527) % | 35.5 | 80.2 | 15.8 | 79.5 |
| YI | | | 39.40 | 38.84 |
| Thermostability 260° C. | | 2 | | 1 |
| Thermostability 270° C. | | 2 | | 2 |
| Thermostability 280° C. | | 3 | | 2 |
| Thermostability 290° C. | | 4 | | 4 |
| Thermostability 300° C. | | 6 | | 5 |

TABLE 2

Composition and properties of the ABS moulding compositions

| Example | 1 | 2 (comparison) | 3 | 4 (comparison) |
|---|---|---|---|---|
| Components parts by weight | | | | |
| A1 | — | 40 | — | — |
| A2 | — | — | — | 40 |
| A3 | 40 | — | — | — |
| A4 | — | — | 40 | — |
| C | 60 | 60 | 60 | 60 |

TABLE 2-continued

Composition and properties of the ABS moulding compositions

| Example | 1 | 2 (comparison) | 3 | 4 (comparison) |
|---|---|---|---|---|
| Properties | | | | |
| $a_k$ (ISO 1801 A) kJ/m² | 19.0 | 14.6 | 21.1 | 19.5 |
| $a_k$ (ISO 1801 A) kJ/m² | 110 | 79 | 155 | 84 |
| DR (ISO 527) % | 17.4 | 8.6 | 9.6 | 6.7 |
| YI | 37.3 | 38.4 | 35.6 | 38.0 |

What is claimed is:

1. A polymer prepared from at least one ethylenically unsaturated monomer selected from the group consisting of ethylene, propylene, 1,3-butadiene, isoprene, vinyl acetate, styrene, α-methylstyrene, styrenes substituted at the nucleus, vinyl cyanides, maleic anhydride, N-substituted maleimides, $C_1$–$C_8$-alkyl acrylates and $C_1$–$C_8$-methacrylates, wherein said polymer is selected from at least one of homopolymers and copolymers, has a mean particle diameter of 0.04 μm to 1 μm, and contains >100 ppm of coarse portions having a mean particle diameter of from 200 to 500 μm.

2. The polymer of claim 1 wherein said polymer contains ≦50 ppm of coarse portions having a mean particle diameter of from 200 to 500 μm.

3. The polymer of claim 1 wherein said polymer contains ≦1000 ppm of coarse portions having a mean particle diameter of from 100 to 200 μm.

4. The polymer of claim 1 wherein said polymer contains ≦500 ppm of coarse portions having a mean particle diameter of from 100 to 200 μm.

5. The polymer of claim 1 wherein said polymer contains ≦10,000 ppm of coarse portions having a mean particle diameter of from 50 to 100 μm.

6. The polymer of claim 1 wherein said polymer contains ≦5000 ppm of coarse portions having a mean particle diameter of from 50 to 100 μm.

7. A thermoplastic molding composition comprising the polymer of claim 1.

8. A method of using the thermoplastic molding composition of claim 7 comprising molding an article therefrom.

9. The molded article made by the method of claim 8.

10. The thermoplastic moulding composition of claim 7 further comprising a graft copolymer prepared from resin-forming vinyl monomers and a rubber substrate.

11. The thermoplastic moulding composition of claim 7 wherein said moulding composition comprises at least one of thermoplastic polycarbonates and polyester carbonates.

12. The thermoplastic moulding composition of claim 7 wherein said moulding composition comprises thermoplastic polyesters.

13. The thermoplastic moulding composition of claim 7 further comprising at least one flameproofing agent.

14. The thermoplastic moulding composition of claim 7 further comprising at least one inorganic compound.

15. The thermoplastic moulding composition of claim 7 wherein said moulding composition comprises thermoplastic fluorinated polyolefins.

* * * * *